United States Patent [19]

Thibault

[11] 4,456,113
[45] Jun. 26, 1984

[54] PICKING IMPLEMENT

[76] Inventor: Alphée Thibault, 4347 Charlemagne St., Montreal, Canada, H1X 2H2

[21] Appl. No.: 331,145

[22] Filed: Dec. 16, 1981

[51] Int. Cl.³ ............................................. B65G 11/08
[52] U.S. Cl. .......................................... 193/7; 53/248; 53/260; 193/28
[58] Field of Search ....................... 193/7, 27, 28, 32; 53/248, 260

[56] References Cited

U.S. PATENT DOCUMENTS

| 1,583,833 | 5/1926 | Howell | 193/27 |
| 3,194,375 | 7/1965 | Callow, Sr. | 193/7 |
| 3,486,599 | 12/1969 | Thibault | 193/7 |
| 4,161,243 | 7/1979 | Grisnich | 193/32 X |

Primary Examiner—Jeffrey V. Nase

[57] ABSTRACT

An implement to be used by a fruit picker person to gently deposit the fruits in a box, directly from climbed positions near the box, irrespective of the level of fruits in the box, with easy and readily removal from among the fruits when the box has been filled, and with readily disconnectable components for convenient assembly and dessassembly in the orchard. This fruit picking implement comprises a support fitting onto a conventional orchard box, a frame removably mountable on the support, a hanger bracket removably connecting to the frame, fruit braking shelves pivotally attached to the hanger bracket, and a flexible tube having one end hooking to the belt of one fruit picker person and having another end entering into a whirling eductor overlying the uppermost shelf to gently drop fruits successively onto that uppermost shelf and dropping of the fruits serially through the vertically spaced apart shelves.

10 Claims, 10 Drawing Figures

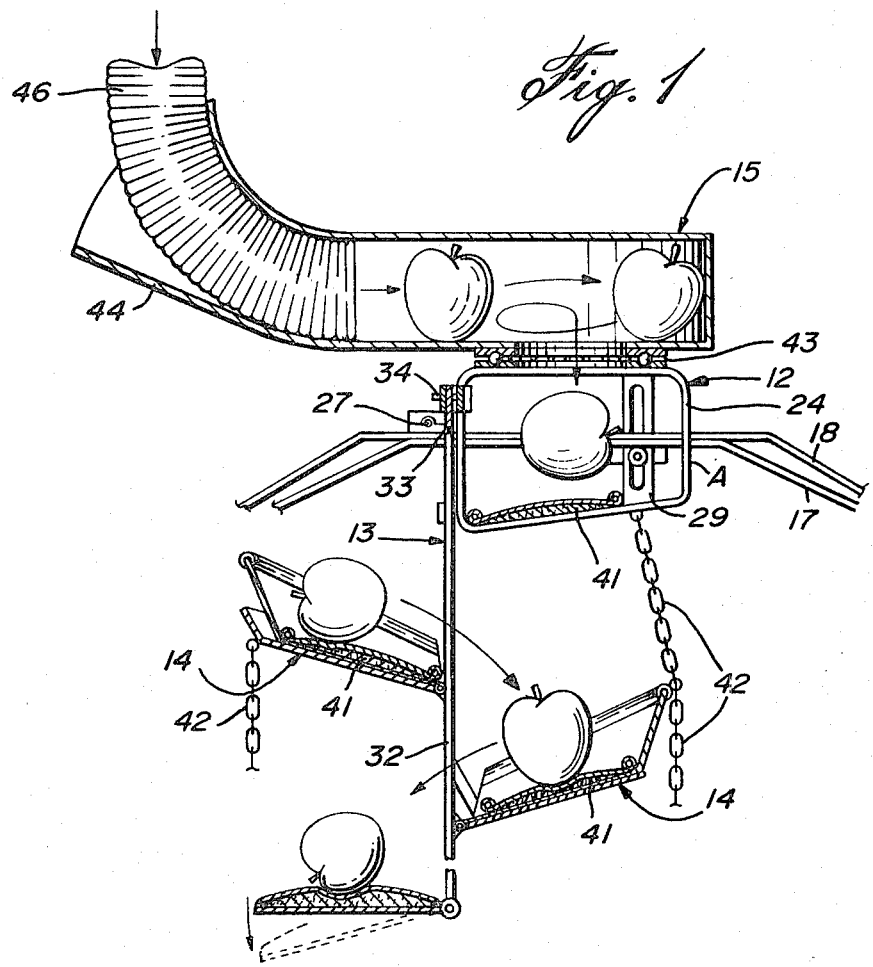
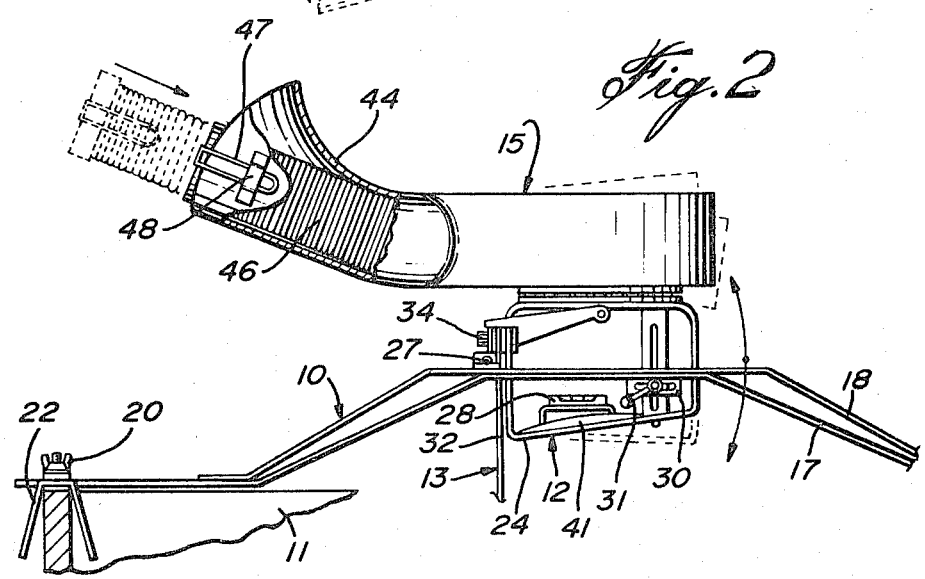

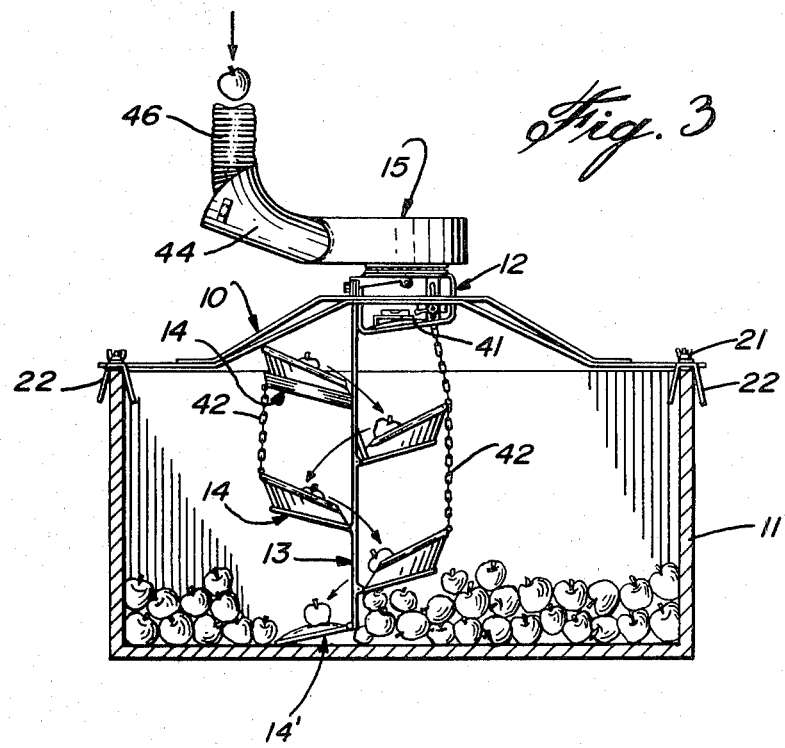
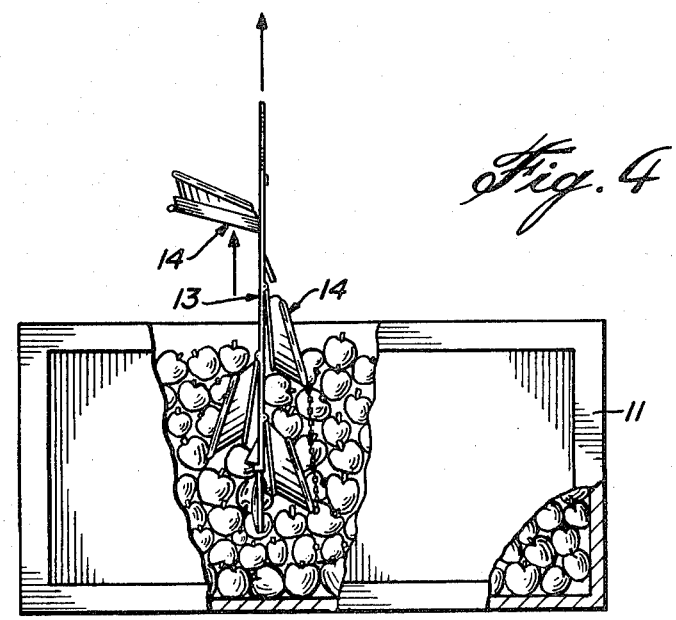

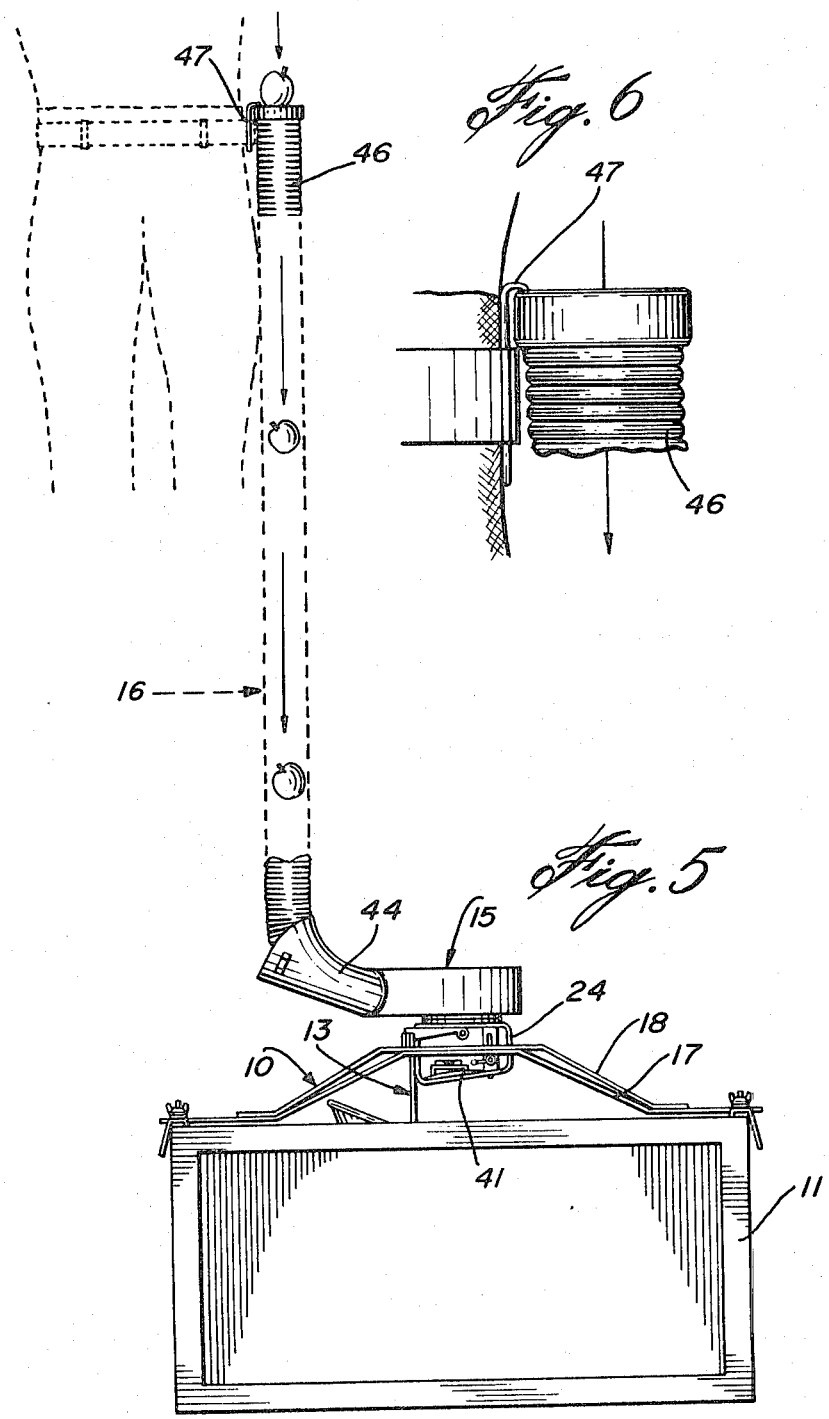

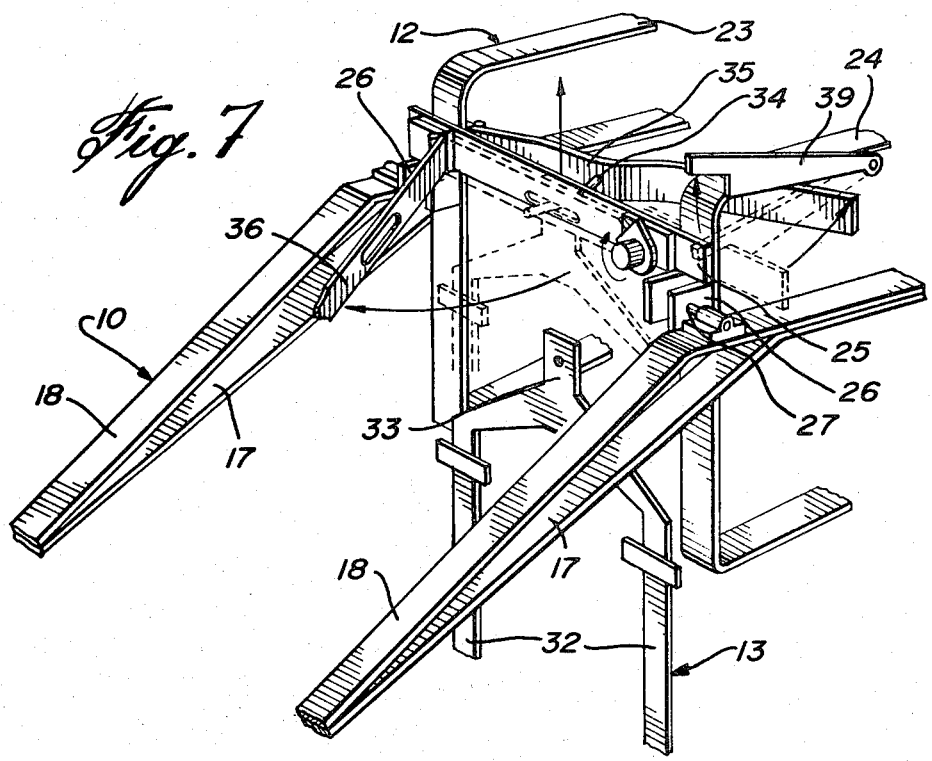
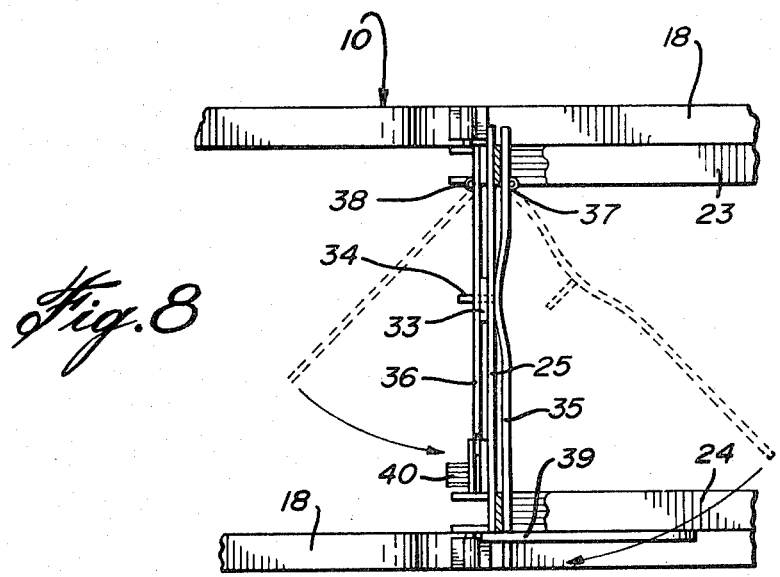

PICKING IMPLEMENT

FIELD OF THE INVENTION

This invention relates to a device or implement to help the picking of fruits.

DESCRIPTION OF THE PRIOR ART

The fruits are currently picked by hand from the trees and this, even in the large orchards. The fruits are then placed in generally standard boxes right in the orchard before being taken away. Such procedure is very tedious and labor intensive. In Canadian Pat. No. 832,733 issued Jan. 27, 1970, it has been proposed a fruit picker device that is used in association with such standard orchard boxes and that allows to pick the fruits without having to climb to reach them. The patented device includes a flexible tube to channel the fruits into a box and a receiver member to whirl the fruits and gently drop them onto a chute suspended in the box.

SUMMARY OF THE INVENTION

It is a general object of the present invention to provide a fruit picking implement that retains the very desirable hand picking operation and that saves time and efforts by allowing the fruit picker person to put the fruits directly in a box from climbed positions near the box.

It is another general object of the present invention to provide a fruit picking implement that allows to gently deposit the fruits in a box irrespective of the level of fruits in the box at any particular instant.

It is another object of the present invention to provide a fruit picking implement that extends downward substantially to the bottom of the box and that is easily and readily removable from among the fruits when the box has been filled.

It is a further object of the present invention to provide a fruit picking implement that is made into components readily disconnectable one from another for convenient assembly and dissassembly in the orchard.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings; in which:

FIG. 1 is an elevation view in cross section of a fruit picking implement according to the present invention;

FIG. 2 is an elevation view of a portion of the fruit picking implement of FIG. 1;

FIG. 3 is a side elevation of the fruit picking implement more completely shown operatively mounted on an orchard box;

FIG. 4 is a side elevation view of a hanger bracket and shelves assembly forming a detachable part of the fruit picking implement and shown in position of withdrawal from a filled orchard box;

FIG. 5 is an elevation view of the same fruit picking implement in operatively hooked position to the belt of a fruit picker person;

FIG. 6 is a detailed view of the tubular inlet portion that hooks to the belt of one fruit picker person;

FIG. 7 is a perspective of a frame support, and hanger bracket forming part of the fruit picking implement more completely shown in FIGS. 1, 2, and 5;

FIG. 8 is a top view of the assembly of FIG. 7 to illustrate a clamping assembly to removably suspend the hanger bracket to the frame;

DESCRIPTION OF THE PREFERRED EMBODIMENT

Figure 9:
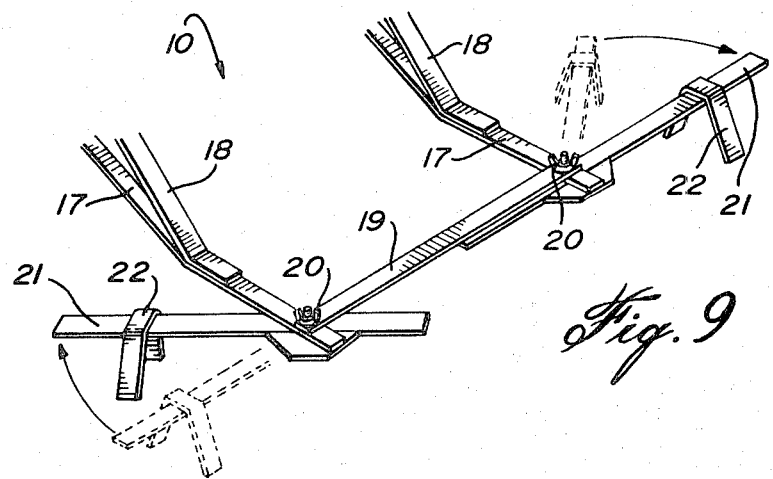
FIG. 9 is a perspective view to illustrate a portion of a support and how it adjustably fits on an orchard box.
Figure 10:
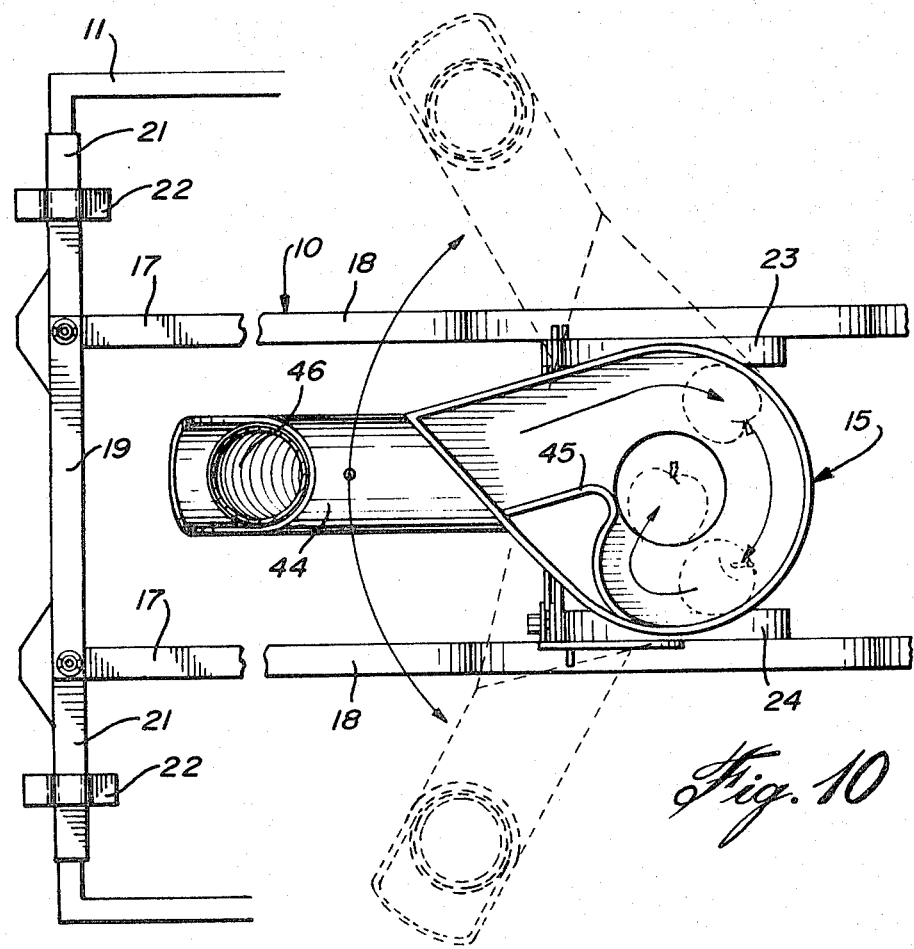
FIG. 10 is a top view of a whirling eductor and the associated frame and support to hold it in place over an orchard box.

The illustrated fruit picking implement comprises a support 10 adapted to rest onto an orchard box 11 of conventional construction, a frame 12 removably secured to the support 10, a hanger bracket 13 removably suspendable to the frame 12, fruit braking shelves 14 pivotally connected to the hanger bracket 13, a whirling eductor 15 rotatably mounted on the frame 12, and a fruit channel device 16 connected to the whirling eductor.

The support 10 includes a pair of laterally spaced apart blade assemblies each made of a main blade member 17 and an auxiliary reinforcing blade member 18. The blade members 17 include an elevated portion having the corresponding blade member secured over it and opposite ends projecting over opposite sides of the orchard box 11. A transverse bar 19 extends transversely between each pair of adjacent ends of the blades 17 and are removably connected thereto at its opposite ends by wing nuts 20. An arm 21 is also connected at each end of each transverse bar 19 and is pivotally adjustable by the corresponding wing nut 20. Each arm 21 is provided with an inverted U shape bracket 22 arranged to grip onto the edge of the orchard box 11 and hold the support 10 in operative position. The pivotable adjustable arms 21 allow to fit the support 10 on boxes of different sizes.

The frame 12 includes a pair of closed loop members 23, 24 secured immediately inward of the aforementioned blade assemblies. A crossbar 25 interconnects the closed loop members 23, 24, in fixed laterally spaced apart relationship. A pair of brackets 26 is fixedly secured to each closed loop member 23, 24. A pin 27 is mounted on each blade member 18 and pivotally engages into the corresponding bracket 26 to pivotally suspend the frame 12 onto the support 10.

A gas bubble level 28 is mounted on the closed loop member 24. A vertically slotted member 29 is fixed to one of the closed loop members 23 or 24 to angularly move with it relative to the support 10 and around the pins 27. A slotted block 30 is secured to the main blade member 17 adjacent the slotted member 29 and a tightening handle 31 is provided to adjustably fix the slotted block against the slotted member and thus adjustably set the frame 12 angularly relative to the support 10. This allows to level the flat upper portion of the closed loop members 23, 24 and thus correct for any non-level positioning of the orchard box 11.

The hanger bracket 13 is of fork shape including a pair of downward projections 32 and a central upward projection 33. The latter is provided with a central aperture to be pivotally suspended by a pin 34. The latter projects endwise from one side of a clamping member 35, supportingly extends through the crossbar 25, and through the projection 33 and another clamping member 36. The clamping members 35, 36 are hinged at one end against the opposite sides of the crossbar 25, at 37, 38 to clampingly close against the crossbar and clamp the hanger bracket 13 against the crossbar and suspendingly on the pin 34. A first latch member 39 is pivoted to the closed loop member 24 to releasably hold the latch member 35 in operative position. A second latch member 40 in the form of a rotating device is arranged to selectively engage the clamping member 36 in clamped position as shown in FIG. 8.

A number of shelves 14 are pivotally attached to the hanger bracket 13 one below another and alternatively one side and the other side of it, as shown. The fruit braking shelves 14 angularly droop toward the hanger bracket 13. A lowermost shelf 14' is pivotally attached to the lower end of hanger bracket 13 and is spring loaded to normally take a position perpendicular to bracket 13 and directed away from the adjacent shelf 14. Shelves 14 and 14' are each lined with a cushioning pad 41 to avoid damaging the fruits that drop and roll down on those shelves, as will be better explained later. A cushioning pad 41 is also provided on the lower portion of the closed loop frame members 23, 24. A tie in the form of a chain 42 interconnects the pivotable shelves 14 such that upon release of the tie in chain, the shelves 14 will be allowed to pivot downward relative to the hanger bracket 13 when the latter is upwardly pulled, as shown in FIG. 4, to withdrawn the assembly from a filled box. During this movement shelf 14' pivots downwardly under the weight of the fruits and against the action of the spring.

The whirling eductor 15 is rotatably mounted on the closed loop members 23, 24 by means of an annular ball bearing 43. The bottom of the whirling eductor 15 is provided with an outlet aperture overlying the pad 41 carried by the closed loop frame members 23, 24. The whirling eductor is provided with a tubular inlet 44 that outwardly enlarges upwardly. The whirling eductor is interiorly formed with a partition 45 appropriately curved to define a whirling passage for the fruits that eventually guides the fruit toward dropping down through the outlet aperture in the bottom of the eductor.

A flexible and extendible tube 46 has a lower end engaged in the tubular inlet 44 and limited to a gradual upward curvature by the upward curvature of the outwardly widening inlet. The upper inlet end of the tube 46 is provided with a hook 47 arranged to hook onto the belt of a fruit picker person, shown in dotted lines in FIG. 5.

As can be readily understood, the fruits are dropped into the upper inlet end of the tube 46 in which they fall relatively gently. The fruits tangentially enter in the whirling eductor 15 to slow down in the latter by whirling before dropping through the outlet in the bottom of the eductor. The fruits are braked by dropping cascadingly as shown by the arrows in FIG. 3 until they fall onto the lowermost shelf 14'. When the box is empty, shelf 14', which is initially horizontal, pivots downwardly under the weight of the fruit until it abuts the bottom of the box and the fruit gently rolls into the box. When the box is full, the chain 42 is released and the hanger bracket 13 is detached from the frame 12. The hanger bracket 13 is then pulled in the direction of the arrows in FIG. 4. The shelves 14 then being freed from the chain 42, they are allowed to pivot downward relative to the rising hanger bracket 13. Also, shelf 14' pivots downwardly against the bias of its spring. This minimizes disturbance of the fruits and bruising of the latter by the rising shelves.

It must be noted that the illustrated fruit picking implement can be completely taken apart and readily assembled in the orchard. For instance, the tube can be fully retracted in the tubular inlet 44 with the hook 47 held in a bracket 48, as shown in FIG. 2. The frame 12 can be disconnected from the support 10 and the hanger bracket 13 from the frame.

What I claim is

1. A fruit-picking implement comprising a support frame adapted to be mounted across the open top of fruit-collecting container, a hanger bracket suspended from said support frame to extend within said container, a plurality of rigid fruit-braking shelves carried by said hanger bracket spacedly along the same and adapted to be covered by fruits in said container, at least some of said shelves being pivotally connected to said hanger bracket for upward pivotal movement from a collapsed position alongside said hanger bracket, said shelves being arranged in vertically-spaced and alternate side tiers on opposite sides of said hanger bracket, tie means detachably maintaining said pivoted shelves in an operative position drooping angularly towards the next lower shelf of an opposite tier, said pivoted shelves taking said collapsed position when detached from said tie means to allow upward removal of said hanger bracket and shelves from within said container, even when full of fruits, and a fruit channel means mounted on said support frame over said hanger bracket and constructed to channel a fruit onto the topmost shelf of said shelves.

2. A fruit-picking implement as defined in claim 1, wherein all of the shelves are pivoted to said hanger bracket, except the topmost shelf of each tier.

3. A fruit-picking implement as defined in claim 2, wherein said support frame includes a first section adapted to rest directly on top of said container, and a second section removably and pivotally mounted on said first section over the open top of said collecting container, said hanger bracket pivotally connected at its top end to said second section, the latter carrying said fruit channel means and forming a topmost fruit-braking shelf, and means to adjust the vertical angular pivoted position of said second section with respect to said first section to adjust the inclination of said topmost fruit-braking shelf.

4. A fruit-picking implement as defined in claim 3, further including means to suspend and lock said hanger bracket to said second section, including a first clamping member hinged to said second section and carrying a suspension pin from which said hanger bracket is to be suspended, a first latch member connected to said frame member and releasably holding said first clamping member in operative position with the pin suspendingly engaging the hanger bracket, a second clamping member hinged to said second section and clampingly pivotable relative to the hanger bracket cooperatively with the first clamping member and a second latch member connected to said second section and releasably holding the second clamping member in operative position clampingly holding the hanger bracket onto said pin.

5. A fruit-picking implement as defined in claim 1 or 3, wherein each shelf is provided with a fruit-cushioning pad.

6. A fruit-picking implement as defined in claim 3, wherein said channel means has an outlet located above and in register with said topmost fruit-braking shelf.

7. A fruit-picking implement as defined in claim 3, wherein said first section comprises a pair of laterally spaced-apart blade assemblies, each made of a main blade member and an auxiliary reinforcing blade member; and main blade members having opposite ends projecting over opposite sides of said fruit-collecting container; a transverse bar extending transversely between each pair of adjacent ends of said blade members and removably connected thereto at its opposite ends; an arm pivotally adjustably connected at each end of each said transverse bar; each said arm being provided with an inverted U-shape bracket arranged to grip the top edge of said fruit-collecting container.

8. A fruit-picking implement as defined in claim 7, wherein the second section includes a pair of closed loop members secured immediately inwardly of said blade assemblies; a pair of brackets fixedly secured to each said closed loop member; a pivot pin mounted on each said auxiliary blade member, being adapted to pivotally engage the corresponding said bracket, thereby pivotally suspending said second section to said first section.

9. A fruit-picking implement as defined in claim 8, wherein levelling means for said second section are provided.

10. A fruit-picking implement as defined in claim 3 or 9, wherein said means to adjust the angular pivoted position of said second section include a vertically-slotted member fixed to one of said closed loop members, thereby moving angularly with the latter relative to said first section, a slotted block secured adjacent said slotted member to one of said main blade members; a tightening handle engaging the slots of said slotted member and of said slotted block and adapted to adjustably fix said slotted block against said slotted member.

* * * * *